June 21, 1927.
A. S. HOWELL
1,633,101
PANORAMING DEVICE FOR PHOTOGRAPHIC CAMERAS
Filed Aug. 6, 1925     2 Sheets-Sheet 1
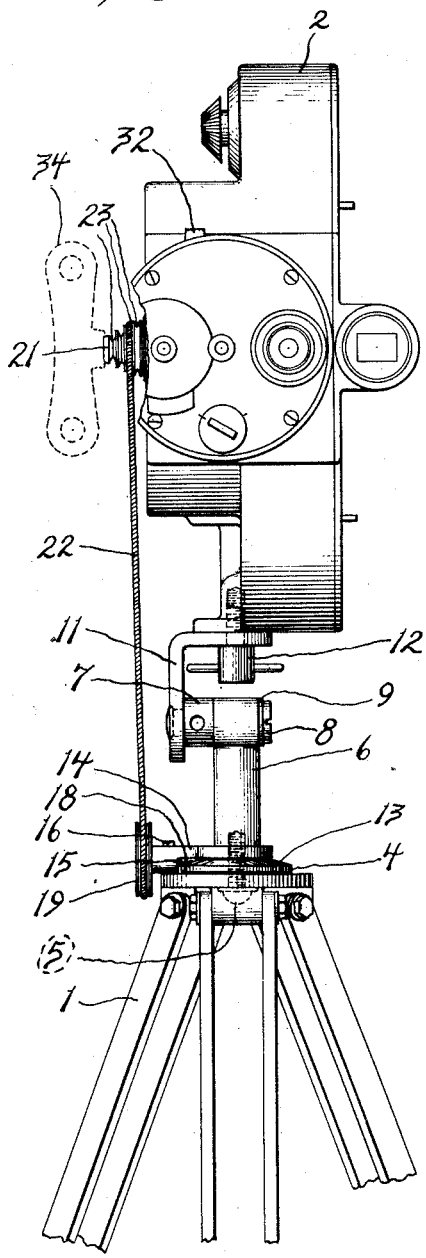
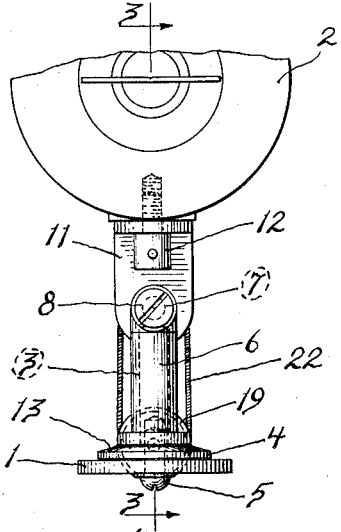
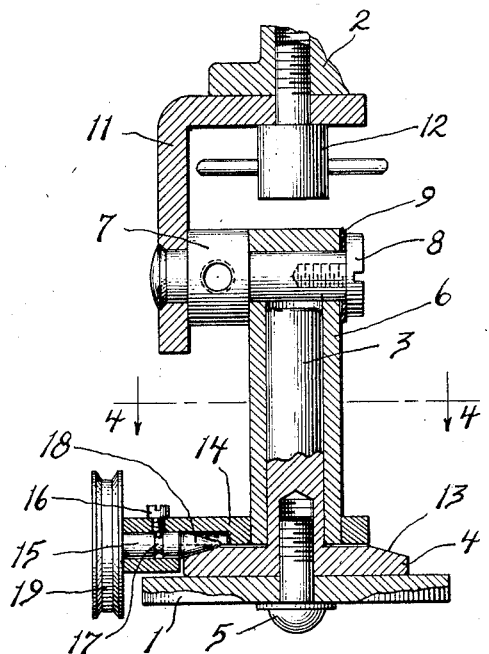
Inventor:-
Albert S. Howell
By Miehle & Miehle, Attys.

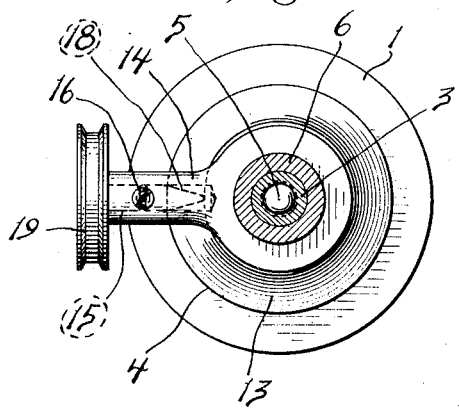
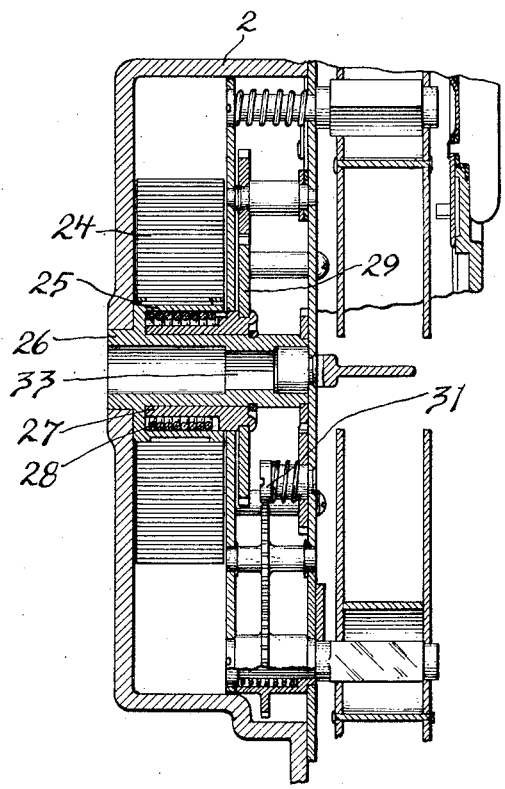
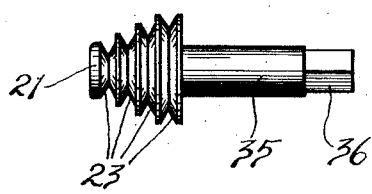

Patented June 21, 1927.

1,633,101

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

PANORAMING DEVICE FOR PHOTOGRAPHIC CAMERAS.

Application filed August 6, 1925. Serial No. 48,544.

My invention relates particularly to a panoraming device for motion picture cameras although not limited to this use alone.

The main features of the invention relate to a panoraming device which automatically effects panoraming movement to the camera during operation thereof to take pictures whereby the operator is relieved from having to turn the camera through its panoraming movement and whereby a steady panoraming movement is effected.

With these features in view my invention consists in certain features of novelty in the construction, combination, and arrangement of parts by which the said features and certain other features, hereinafter appearing, are effected, all as fully described with reference to the accompanying drawings and more particularly pointed out in the appended claims.

In the said drawings—

Figure 1 is a front elevation of a motion picture camera equipped with my present invention and mounted on a tripod.

Figure 2 is a partial side elevation of the same.

Figure 3 is an enlarged section on the line 3—3 of Fig. 2.

Figure 4 is a section on the line 4—4 of Fig. 3.

Figure 5 is an enlarged partial central transverse vertical section of the camera.

Figure 6 is a side view of the camera pulley hereinafter described.

Like characters of reference indicate like parts in the several views.

Referring to the drawings 1 designates a tripod of usual construction and 2 designates generally a spring motored motion picture camera. See Fig. 1.

The camera is supported from the tripod in the following manner. A spindle 3 enlarged at one end to form a base 4 is secured on the head of the tripod, by means of a headed screw 5 passing through the head of the tripod and screwthreaded into the spindle 3, with the base 4 resting on the upper surface of the tripod head. See Figs. 1 and 2. The spindle 3 forms one pivot member, and a complemental bored pivot member 6 has the bore thereof engaged with the spindle 3 above the base 4 for angular movement thereon.

A shouldered stud 7 is engaged for angular movement on an axis normal to the pivotal axis of the pivot member 6 in a transverse bore through this pivot member at its upper end, and a headed screw 8 is screwthreaded into the stud 7 and clamps a spring washer 9 and the pivot member 6 between its head and the shoulder of the stud whereby a frictional pivot is formed. See particularly Fig. 3. An L-shaped member 11 has one leg thereof secured to the free end of the stud 7 and has the other leg thereof overlying the pivot member 6. The other leg of the member 11 forms a support for the camera 2, and a headed screw 12 passing through an aperture in the last mentioned leg of the member 11 and is screwthreaded into the frame of the camera for detachably securing the camera thereon. Thus the camera is supported, and as so supported is adapted for panoramic movement by reason of the pivot member 6 being engaged for angular movement on the spindle 3 and is also adapted for tilting adjustment by reason of the stud 7 being angularly moveable on the pivot member 6, the spring washer 9 permitting such tilting movement and at the same time maintaining the camera in any desired position in its tilting movement.

The base 4 is provided with a relatively large upwardly and outwardly facing circular bevel surface 13 at its periphery and disposed concentrically with the axis of the spindle 3. See particularly Figs. 3 and 4. The pivot member 6 is provided at its lower end with an extension 14 fast therewith, and mounted for rotation in a bore of this extension is a shaft 15 disposed radially of the axis of the spindle, end thrust of the shaft being taken up by means of a headed screw 16 screwthreaded into the extension 14 and engaged in an intermediate circumferential groove 17 in the shaft. The shaft 15 is provided at its inner end with a relatively small concentric tapered portion 18 arranged correspondingly with said bevel surface and engaged therewith for angularly moving the pivot member 6 on the spindle 3 with rotation of the shaft and forming a downward thrust bearing for the pivot member 6, the lower end of this pivot member being spaced from the base 4 as may be clearly seen in Fig. 3. Thus the weight of the pivot member 6 and attached parts and of the camera serve to exert sufficient pressure on the shaft 15 to maintain the tapered portion 18 of the shaft in frictional engagement with the bevel surface 13 for driving. This frictional drive affords a simple, effective, and smoothly acting speed reducing drive for panoraming the camera, it being obvious that by the arrangement above described movement of the pivot member 6 upon the spindle 3 effects angular panoraming movement of the camera 2. A grooved belt pulley 19 is secured on the outer end of the shaft 15 for driving the same.

The shaft 15 is driven through the pulley 19 with the mechanism, hereinafter described, of the camera 2 when it is operated to take pictures by means of a grooved belt pulley 21 on the camera and driven with the mechanism thereof and an endless spring belt 22 trained over the pulley 21 and the pulley 19. See Figs. 1 and 2. The pulley 21 is provided with a number of belt grooves 23 of different diameters whereby the speed of the panoramic movement may be varied by engaging the belt 22 in different grooves, the stretch of the belt accommodating both for the different grooves 23 and the tilting of the camera as before described.

The camera 2 as shown is provided with a spring motor for driving the mechanism thereof which will now be described. See Fig. 5. A spiral power spring 24 has the outer end thereof held stationary and the inner end thereof is secured to a cylindrical flange 25 of a revoluble primary spindle 26. A hub 27 is revolubly mounted on the spindle 26, and a helical spring brake coil 28 has one end secured to the hub 27 and frictionally engages the inner surface of the flange 25 to form an automatic one way driving connection between the spindle 26 and the hub 27. A primary driving gear 29 is secured on the hub 27 and through this the spring motor drives the mechanism, generally indicated at 31, of the camera for taking pictures, the operation of the camera mechanism being controlled by an exteriorly accessible push stud 32, see Fig. 1, in a manner unnecessary to be described. By reason of the automatic one way driving connection above described the spindle 26 serves for winding up the spring 24 and also serves for driving the camera mechanism from the spring 24, said one way driving connection driving the hub 27 in the direction of unwinding movement of the spring and releasing the hub in the opposite direction. It is obvious that the spindle 26 revolves with the spring in both directions.

The spindle 26 is exteriorly exposed at one end and is hollow and is provided with an interior clutch formation 33 whereby a winding key having a correspondingly shaped shank may be detachably mounted in the bore of this spindle for winding up the spring 24. A key mounted in the bore of the spindle 26 is shown in dotted lines at 34 in Fig. 1.

The pulley 21 is provided with a shank or shaft 35, see Fig. 6, having a clutch formation 36 corresponding with the clutch formation 33 of the spindle 26, and this shank or shaft is detachably inserted into the bore of the spindle 26 and the clutch formations 33 and 36 engaged when it is desired to effect panoramic movement of the camera 2 automatically with the operation of the mechanism of the camera to take pictures, this pulley being detached when it is desired to wind up the spring 24. Thus the drive of the panoramic device is effected without altering the camera.

While I have described and shown the preferred embodiment of my invention I do not wish to be limited to the precise details of construction as changes may readily be made without departing from the spirit of my invention, but having thus described my invention, I claim as new and desire to secure by Letters Patent the following:—

1. The combination with a motion picture camera having a spring motor for operating the same and including a revoluble primary spindle by means of which the spring of the motor is wound up and the camera is operated by the spring of the motor, said spindle having a clutch formation adapted for detachable engagement with a winding key for winding up the motor, of means for supporting the camera for panoraming movement, and means driven from the motor for automatically panoraming the camera during operation thereof including a revoluble member detachably engaged with said clutch formation for driving from said spindle.

2. The combination with a motion picture camera having a spring motor for operating the same and including a revoluble primary spindle by means of which the spring of the motor is wound up and the camera is operated by the spring of the motor, said spindle being provided with a formation adapted for the detachably mounting of a winding key thereon for winding up the motor, of means for supporting the camera for panoraming movement, and means driven from the motor for automatically panoraming the camera during operation thereof including an exterior belt pulley member provided with a number of belt grooves of different diameters and having a formation corresponding with said first mentioned formation and adapted for detachably mounting thereon for driving from said spindle.

3. In a device of the character described the combination of a camera pivot support including two pivot members engaged for relative angular movement on a vertical axis, a circular upwardly and outwardly facing bevel friction surface of a relatively large diameter fast on one of said members and disposed coaxially with the pivot axis, a horizontally disposed revoluble member mounted on the other pivot member on an axis disposed radially of the pivot axis and provided with a relatively small concentric tapered portion arranged correspondingly with said bevel surface and frictionally engaged therewith for angularly moving this pivot member on the first mentioned pivot member with rotation of said revoluble member and forming a downward thrust bearing for said other pivot member, and a driving connection between a spindle of the mechanism of a spring motored motion picture camera, secured on said second mentioned pivot member for angular movement therewith, and said revoluble member whereby said revoluble member is driven with the mechanism of the camera.

4. In a device of the character described the combination of a camera pivot support including upper and lower pivot members engaged for relative angular movement on a vertical axis, a circular upwardly and outwardly facing bevel friction surface of a relatively large diameter fast on the lower pivot member and disposed coaxially with the axis of the pivot members, a horizontally disposed revoluble shaft carried by the upper pivot member on an axis disposed radially of the pivot axis and provided at its inner end with a relatively small concentric tapered portion arranged correspondingly with said bevel surface and engaged therewith for angularly moving this pivot member on the lower pivot member and forming a downward thrust bearing for said upper pivot member, and a spring belt and pulley driving connection between the primary driving spindle of a spring motored motion picture camera, secured on said upper pivot member for angular movement therewith, and said shaft whereby said shaft is driven with the mechanism of the camera.

5. In a device of the character described the combination of a pivot spindle enlarged at one end to form a base providing an upwardly facing friction surface, a bored pivot member having its bore engaged with said spindle above said enlargement for angular movement thereon, means for securing a photographic camera on the bored pivot member, a revoluble member mounted on said bored pivot member on an axis disposed radially of said spindle and bearing frictionally on said upper surface of said enlargement to form a downward thrust bearing for the bored pivot member and to angularly move the bored pivot member on the spindle when said revoluble member is rotated, and means for rotating said revoluble member.

6. In a device of the character described the combination of a pivot spindle enlarged at its lower end to form a base, said base having an upwardly and outwardly facing circular bevel surface at its periphery and disposed concentrically with the spindle axis, a bored pivot member having its bore engaged with said spindle above said enlargement for angular movement thereon, means for securing a photographic camera on the bored pivot member, a revoluble shaft mounted on said bored pivot member on an axis disposed radially of said spindle and provided at its inner end with a relatively small concentric tapered portion arranged correspondingly with said bevel surface and engaged therewith to form a downward thrust bearing for the bored pivot member and to angularly move the bored pivot member on the spindle when said shaft is rotated, and a pulley mounted on an outer portion of the shaft for rotating the same.

7. In a device of the character described the combination of a pivot spindle enlarged at one end to form a base providing an upwardly facing friction surface, a bored pivot member having its bore engaged with said spindle above said enlargement for angular movement thereon, means for securing a motion picture camera on said bored pivot member including a pivot device disposed on an axis normal to the pivotal axis of said bored pivot member and adapted for adjustably positioning the camera on the axis of said pivot device, a revoluble member mounted on said bored pivot member on an axis disposed radially of said spindle and bearing frictionally on said upper surface of said enlargement to form a downward thrust bearing for the bored pivot member and to angularly move the bored pivot member on the spindle when said revoluble member is rotated, and means for automatically rotating said revoluble member with operation of the camera mechanism including pulleys respectively on the camera and said revoluble member and a spring belt trained thereover.

8. In a device of the character described the combination of a pivot spindle enlarged at one end to form a base, said base having an upwardly and outwardly facing circular bevel surface at its periphery and disposed concentrically with the spindle axis, a bored pivot member having its bore engaged with said spindle above said enlargement for angular movement thereon, means for securing a motion picture camera on said pivot member including a frictional pivot device disposed on an axis normal to the pivotal axis of said bored pivot member, a revoluble shaft mounted on said bored pivot member on an axis disposed radially of said spindle and provided at its inner end with a relatively small concentric tapered portion arranged correspondingly with said bevel surface and engaged therewith to form a downward thrust bearing for the bored pivot member and to angularly move the bored pivot member on the spindle when the shaft is rotated, a pulley on the outer end of said shaft, a pulley on said camera and connected to be driven with the mechanism thereof, one of said pulleys having a plurality of belt grooves of different diameters, and an endless spring belt trained over said pulleys.

In witness whereof I hereunto affix my signature this 3rd day of August, 1925.

ALBERT S. HOWELL.